United States Patent [19]
Maitre et al.

[11] Patent Number: 5,554,991
[45] Date of Patent: Sep. 10, 1996

[54] DEVICE FOR RECREATING A DYNAMIC IMAGE FROM A RADAR FIELD OF THE INVENTION

[75] Inventors: Bernard Maitre; Xavier Chaella; Thibault De la Fresnaye, all of Saint Cloud, France

[73] Assignee: Electronique Serge Dassault, Saint-Cloud, France

[21] Appl. No.: 179,043

[22] Filed: Apr. 6, 1988

[51] Int. Cl.[6] .................................................. G01S 7/24
[52] U.S. Cl. ........................ 342/184; 342/176; 342/179
[58] Field of Search .................................. 342/176, 177, 342/179, 184, 185, 186, 191, 190

[56] References Cited

U.S. PATENT DOCUMENTS

| | | | |
|---|---|---|---|
| 3,213,447 | 10/1965 | Burrows et al. | 342/176 X |
| 3,246,330 | 4/1966 | Balding | 342/179 |
| 3,525,994 | 8/1970 | Dobson | 342/176 X |
| 4,024,539 | 5/1977 | Quinlivan et al. | 342/179 |

*Primary Examiner*—Gilberto Barrón, Jr.
*Attorney, Agent, or Firm*—Nixon & Vanderhye P.C.

[57] ABSTRACT

A dynamic image is recreated from an observation radar whose extractor supplies an output of blips which are stored. These blips are firstly subject to a range/azimuth processing, which enables the image to be constructed. Then, they are subject to a pre-display processing in order to determine the geometry of the image and its brightness, after which the actual display takes place.

12 Claims, 9 Drawing Sheets

DEVICE FOR RECREATING A DYNAMIC IMAGE FROM A RADAR FIELD OF THE INVENTION

FIELD OF THE INVENTION

The invention relates to image generation techniques in particular on board a vehicle such as an aircraft.

It is desirable to recreate, for the pilot of an aircraft, a dynamic image which is practically superimposable on the visual image which he observes himself in a sight such as in a Head-Up Display (HUD). The availability of such a dynamic image is particularly important, for example for a low altitude flight without visibility.

PRIOR ART

The Applicant's assignees have already proposed the generation of images of this type from stored data, concerning the ground surface, (see FR-A-2524177, as well as an as yet unpublished Certificate of Addition Application 8316580 filed by them). However, these prior devices which give appreciable results have the disadvantage of depending on a mass memory of very large size. Specialists in the field will understand the practical difficulties resulting from this; it is firstly necessary previously to have geographic or topographic data which are suitable for filling this mass memory; it is then necessary to enter these data into the mass memory, taking account of the predicted flight of the aircraft. There also still remains the risk that the aircraft will be caused to deviate so much from the predicted route that it goes outside of the field of data recorded in the mass memory; the pilot can then only rely on his external view. The same comment applies to recently occurring obstacles or to obstacles of a type not shown on maps.

The present invention proposes a different technique for recreating a dynamic image, in particular on board an aircraft or other moving object of the same type.

OBJECTS OF THE INVENTION

One object of the present invention is to recreate a dynamic image from a radar.

Another object of the invention is to create a dynamic image which can be superimposed on a visual image which the pilot can normally perceive in clear weather.

Another object of the present invention is therefore to reflect in the best possible way the perspective and relief data which must be integrated in the said image.

SUMMARY OF THE INVENTION

In general, the present invention provides a device for recreating a dynamic image, on board a vehicle comprising:

an air-to-ground observation radar capable of supplying a series of data or basic radar blips which are expressed in elevation, range and azimuth, and are stored in an output memory of the radar after having been acquired on the basis of a chosen repetition frame, said memory being addressable in range and in azimuth in order to deliver the corresponding elevation information;

means of range/azimuth processing, capable of carrying out at least one range loop paired with at least one azimuth loop, while scanning the said radar output memory in order to replace the current blip by a possibly more distant blip of the same azimuth but having a lower elevation, as well as to define at each range a substantially continuous sequence of image points, obtained by an operation of interpolation and/or extrapolation between the said blips, while taking into account at each azimuth closer image points having a higher elevation, the image points thus obtained being stored in a basic image memory;

means of pre-display processing, associated with at least one buffer memory, in order to determine the brightness of these points as a function of their range; and means of displaying on board the vehicle an image composed of these points with the brightness thus determined.

According to a preferred feature of the invention, the repetition frame of the observation radar is shifted in time as a function of the movement of the aircraft. In effect, the refresh period of the data coming from the radar is generally greater than the display period of these images. This arrangement enables a genuine dynamic image to be obtained, which progresses in a quasi-normal manner for the observer.

Preferably, the means of pre-display processing also carry out an image enlargement as a function of the forward progress of the aircraft and of the range of each point between the refreshes of the output memory of the radar, as well as a modification of the geometry of the image as a function of the change in attitude of the aircraft since the last refresh.

In addition, the pre-display processing means also carry out a modification of the geometry of the image as a function of the position of the point of display or the sight in the aircraft.

As regards the range-azimuth processing means, these advantageously include a range loop executed according to increasing ranges.

More particularly, another advantageous feature of the invention provides for the means of range/azimuth processing to include:

a first stage defining a first range loop paired with a first azimuth loop, while scanning the output memory of the radar in the direction of decreasing ranges, in order to take into account, at each iso-range, any blip of lower elevation encountered, at the same azimuth, over ranges greater than the current iso-range, which supplies a series of modified blips, stored in an intermediate memory; and a second stage defining a second range loop, paired with a second azimuth loop, while scanning the intermediate memory in the direction of increasing ranges, in order to define, at each range, a substantially continuous sequence of image points, obtained by an operation of interpolation and/or extrapolation between the said modified blips, whiler taking into account, for the current range and at each azimuth, closer image points having a greater elevation, the image points thus obtained being stored in the said basic image memory.

Preferably, the first stage also carries out an operation of interpolation and/or extrapolation, which is transitory, during the comparison carried out, azimuth by azimuth, between the current ranges and the greater ranges.

For this purpose, the first stage advantageously includes means for storing, azimuth by azimuth, the lowest elevation encountered at ranges greater than the current range.

Similarly, the second stage can also include means for storing, azimuth by azimuth, the highest elevation encountered at ranges below the current range, and means of choosing the elevations of the current range at least equal to these highest elevations, azimuth by azimuth.

As they follow the radar information refresh rate, the means of range/azimuth processing preferably operate according to a period at least ten times greater than the means of pre-display processing.

Finally, the display can be carried out in frame scanning mode, in which the lines are parallel to the visual horizontal, or in point to point mode, also called "vector" mode.

BRIEF DESCRIPTION OF THE DRAWINGS

Other characteristics and advantages of the invention will appear on examining the following detailed description and the accompanying drawings in which.

DESCRIPTION OF THE PREFERRED EMBODIMENT

Figure 1:
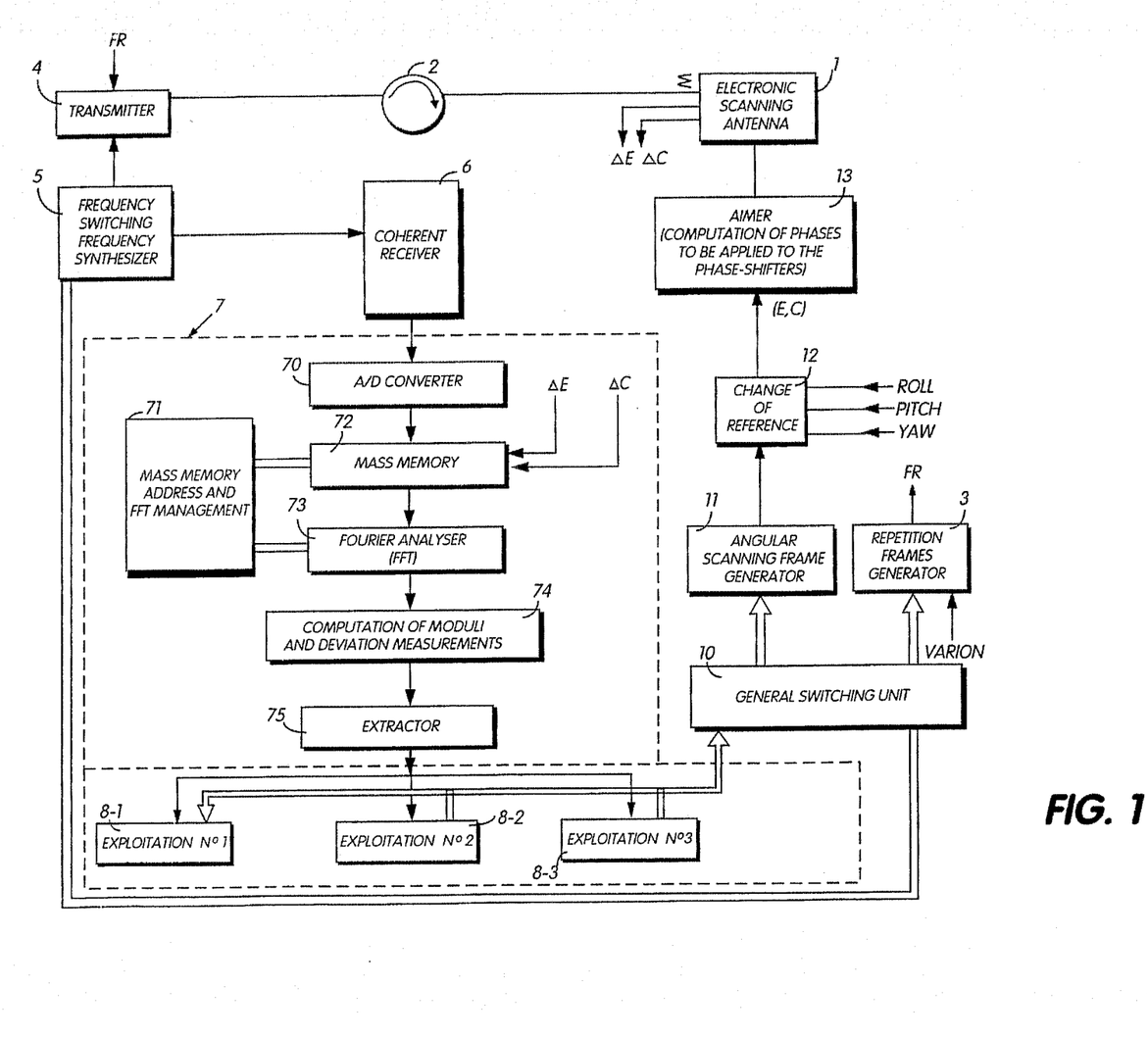
FIG. 1 is the block diagram of a radar reception device which can be used for the implementation of the invention.

The radar firstly includes a conventional antenna or an electronic scanning antenna, referenced 1. This antenna is capable of supplying a sum value, referenced $\Sigma$ as well as two deviation measurement values, referenced $\Delta E$ and $\Delta C$, which are respectively the difference in elevation and the circular difference.

The antenna 1 is connected, from the microwave point of view, to a duplexer 2 such as a circulator.

The transmission input of the circulator 2 is connected to a transmission assembly referenced 4. This transmission assembly receives the microwave frequency to be transmitted from a frequency synthesizer 5. It also receives a repetition control signal referenced FR (for repetition frequency).

The reception output of the circulator 2 is connected to a coherent reception assembly 6, which also receives frequencies from the synthesizer 5.

The output of the coherent receiver 6 is applied to a coherent processing assembly 7.

This starts with an analog-digital converter 70. The output of the analog-digital converter 70 is applied to a mass memory 72, followed by a Fourier analyser 73, preferably of the fast Fourier transform (FFT) type. The devices 72 and 73 are under the control of a device 71 which manages addresses in the mass memory and manages the Fourier analyser.

At the output of the Fourier analyser the rate is for example in the order of $3 \times 10^6$ filters per second and per channel.

This output of the Fourier analyser 73 is applied to a circuit 74 which carries out moduli and deviation measurement computations, in a way known to specialists in the field. Finally the output of the computing device 74 is applied to an extractor 75.

The reception assembly 6, and the processing assembly 7 just described, relate to the sum channel ($\Sigma$) of the output of the antenna 1. A similar arrangement is of course provided for the difference channels $\Delta E$ and $\Delta C$, which end at the mass memory 72.

The output of the extractor 75 also constitutes the output of the processing assembly 7, and consequently of the actual radar.

It is applied to an exploitation assembly 8, which can comprise several exploitation devices 8-1, 8-2, 8-3. One of these relates to the recreation of images according to the invention.

The radar can include a general switching unit 10, which can be incorporated in its management computer. This unit then controls a frequency switching, which must be fast, in the synthesizer 5. Similarly, it controls a repetition frame generator 3, which will define the repetition commands applied to the transmitter 4, for each of the frequencies or more precisely of the sets of frequencies which the synthesizer 5 can produce (to each radar transmission frequency there are also associated local signal frequencies for the frequency changes of the transmission and reception).

The general switching unit 10 also controls an angular scanning frame generator 11, which defines a desired angle, with respect to the ground, for aiming the antenna. A reference change unit 12 corrects this angle as a function of the roll, pitch and yaw indications which are available, in a known way, on board the aircraft. Such indications are usually provided by the on-board inertial navigation system.

The output of the device 12 is thus an indication formed from a pair of values E and C, such as already defined. This pair of values is applied to a device 13 which controls the antenna to ensure its exact aiming according to the desired values of E and of C.

In one embodiment of the antenna 1, this device 13 is an aimer which can compute the phases to be applied to the phase-shifters which the said antenna comprises.

Finally, the general switching unit 10 controls, still with the same time relationship, the various exploitation circuits 8-1, 8-2 and 8-3.

The general organization of the radar of FIG. 1, in particular by means of the switching of the synthesizer 5, of the antenna 1 and of the repetition generator 3 (the assembly starting from the general switching unit 10), enables the radar to carry out several functions by interleaving.

These characteristics are described in greater detail in French Patent Application No. 8417933, filed on 23 Nov. 1984 by Applicant's assignees. This can be referred to in order to include the detailed structure of the radar in the present description.

In the rest of the description it will be accepted that according to the invention the creation of images is carried out by the exploitation circuit 8-1, the other circuits 8-2 and 8-3 serving for conventional radar applications, for example.

Figure 2A:
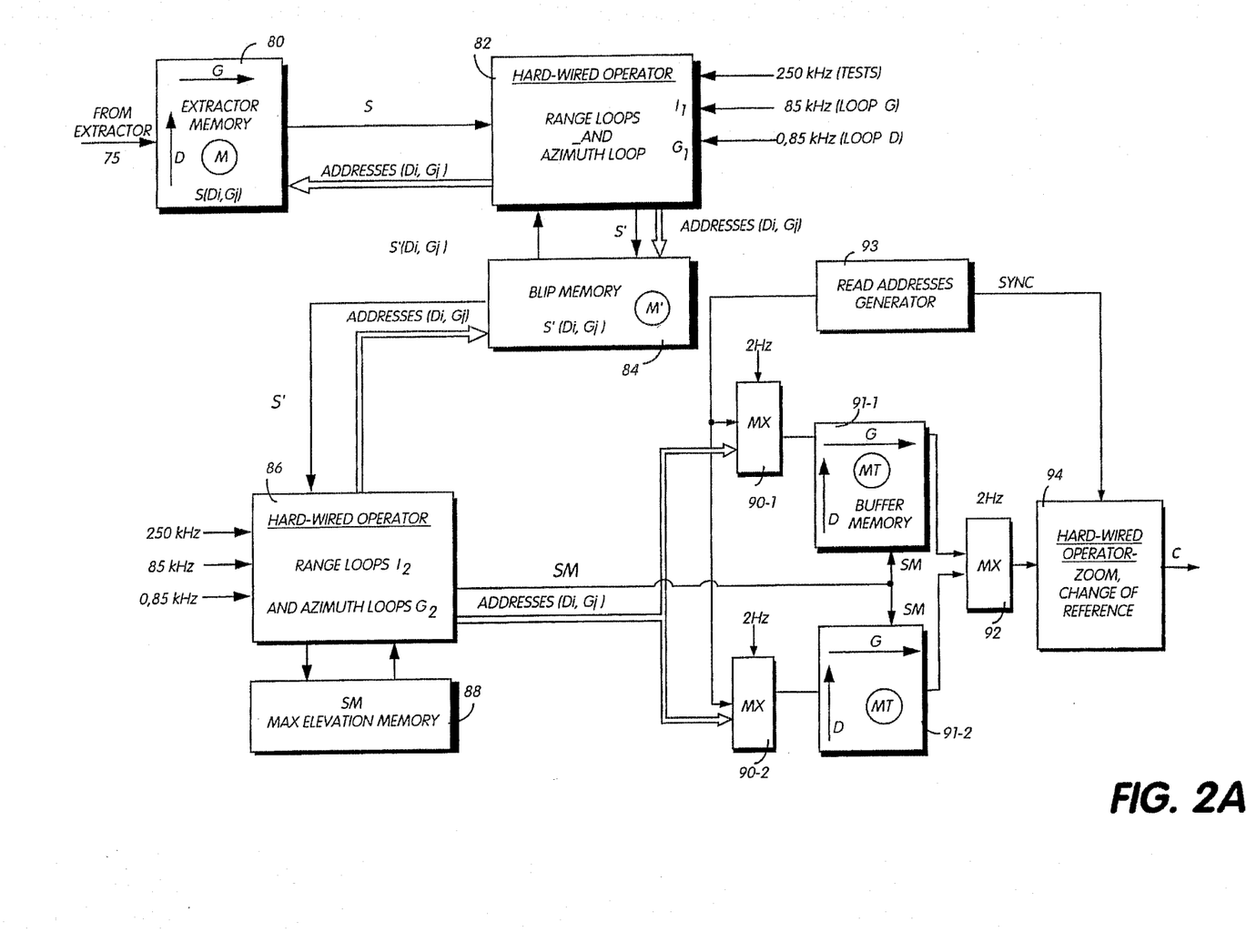
FIGS. 2A and 2B are block diagrams of means enabling, with the radar of FIG. 1, the construction of a device according to the present invention.

In FIG. 2A, a memory 80 receives the digital signals available at the output of the extractor 75 (FIG. 1). This memory, also referenced M, receives data in the form S ($D_i$, $G_j$). This signifies that the memory is addressable firstly in range according to an index i, and then in azimuth according to an index j, and that in each location thus defined by this addressing, it can supply an elevation datum S, as it results from the output of the extractor 75.

A hard-wired operator 82 will be able to carry out a first range loop and a first azimuth loop, by an appropriate addressing in the extractor memory M80.

The range loop is carried out for example at a rate of 0.85 kHz, while the azimuth loop is carried out at 85 kHz, and is in its turn interleaved with test operations carried out at a frequency of 250 kHz.

The functions carried out by the first hard-wired operator 82 provide modified values, now referenced S' ($D_i$, $G_j$), which are stored in a memory M' referenced 84. It again circulates the addresses $D_i$ and $G_j$ as well as the signal S' between the operator 82 and the memory 84. In addition, the memory 84 is capable of supplying the operator 82 with information in the form S' ($D_{i+1}$, $G_j$), i.e. the relative elevation data, azimuth by azimuth, at the range immediately greater than the range being examined. The usefulness of this will be seen later.

The data S' and the corresponding addresses can also be exchanged between the memory 84 and a second hard-wired operator 86, which carry out the second range and azimuth loops, whose rates are the same as for the operator 82 (including the test rate of 250 kHz). The hard-wired operator 86 is assisted by a maximum elevation memory or SM, referenced 88.

The maximum elevation, as well as the corresponding addresses $D_i$, $G_j$ are transmitted through two multiplexers 90-1 and 90-2 to two buffer memories 91-1 and 91-2, which function alternately to supply an output multiplexer 92. The multiplexers 90-1, 90-2 and 92 operate at the basic rate of 2 Hz, which is the refresh rate of the data available at the output of the radar.

A read address generator 93 controls in the same way the multiplexers 90 and the synchronization of another hard-wired operator 94, which form the means of pre-display processing according to the invention, in cooperation with a brightness computing device 95.

Figure 2B:
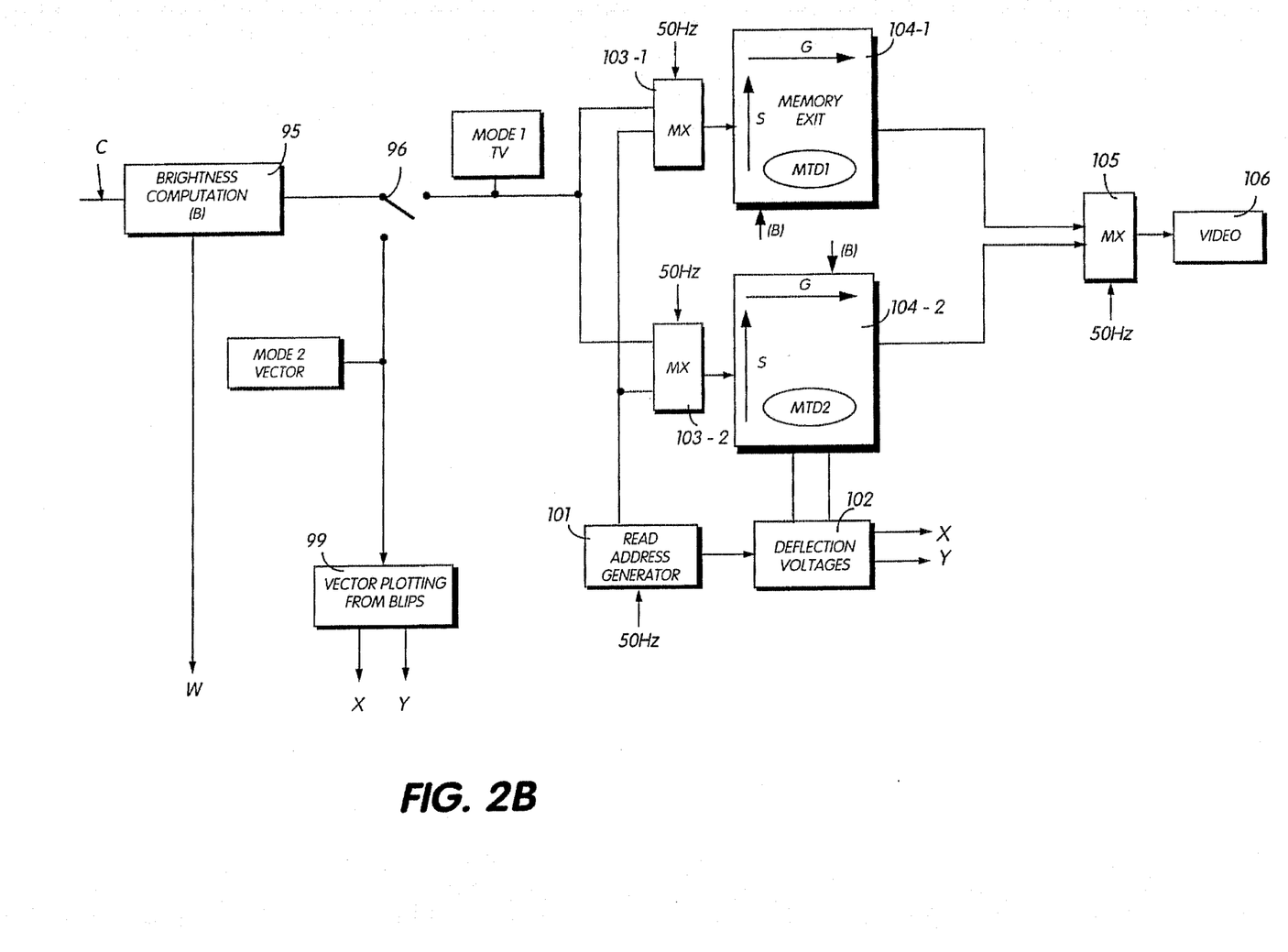

The actual display can be carried out either in vector form, by a device 99 (mode 2), or in television mode, in which case other multiplexers 103-1 and 103-2 which are controlled at 50 Hz fill the video output memories 104-1 and 104-2 operating alternately. The addressing is supplied by a generator 101 which controls the multiplexers 103-1 and 103-2, also at 50 Hz, at the same time as a deflection voltage circuit 102, which controls a cathode ray tube in X and Y. The data available at each address at the output of memories 104-1 and 104-2 are grouped in a final multiplexer 105, which also operates at 50 Hz, and controls the brightness of the spot of the cathode ray tube, by means of conventional video circuits 106.

A specialist in the field will have noted incidentally that the output of the brightness computing circuit 94 directly forms the Wehnelt control W of the cathode ray tube, when it is operating in vector mode 99.

Changing from one display mode to the other is enabled by means of switching here represented by a switch 96.

Figure 3:
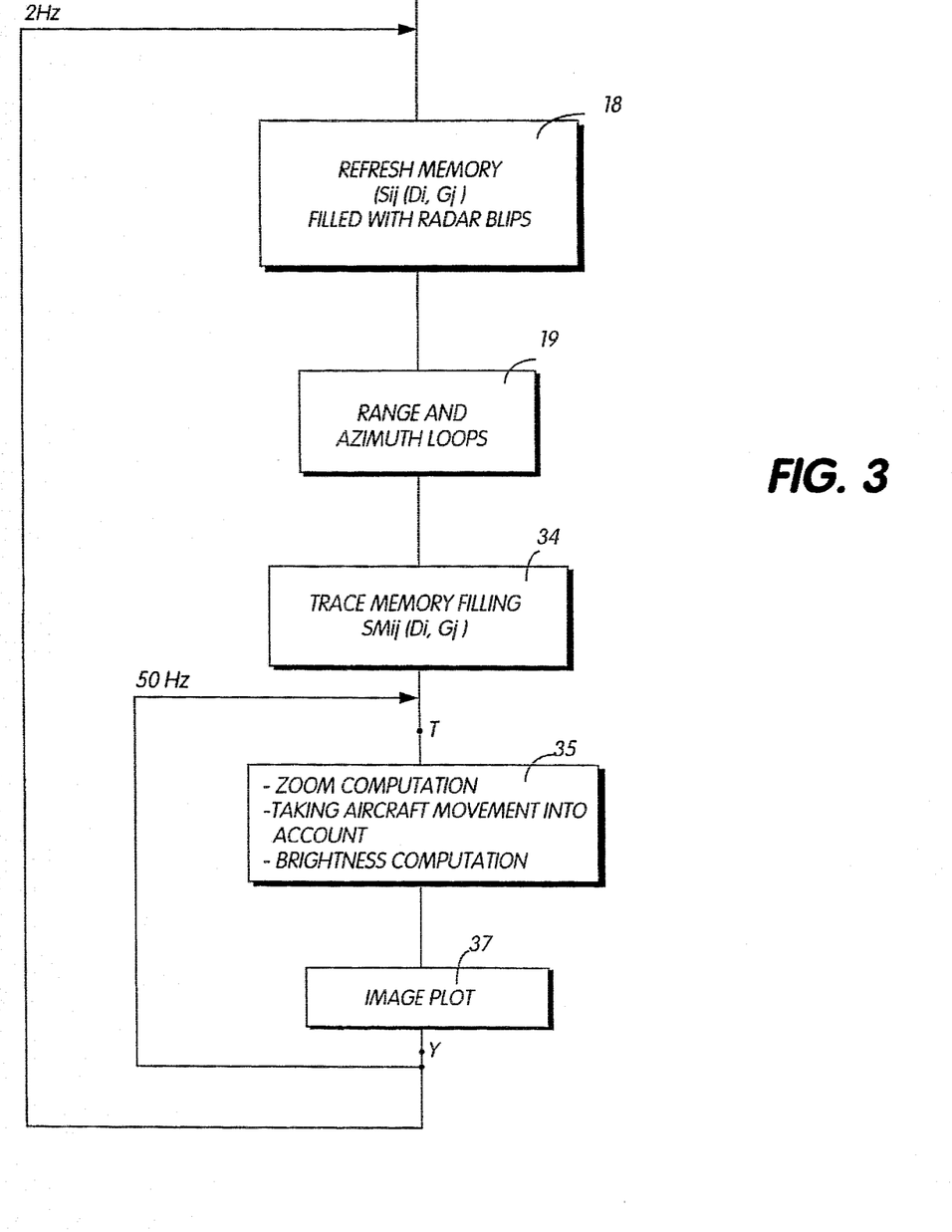
FIG. 3 is the block diagram of various operations carried out by the device of FIGS. 2A and 2B.

FIG. 3 is a general functional flowchart of the device according to the invention. The refreshing of the memory $S_{ij}$ ($D_i$, $G_j$), filled with radar blips (step 18), is therefore carried out at a rate of 2 Hz.

After each refresh there begins the execution by the range/azimuth processing means 19 of at least one range loop, paired with at least one azimuth loop. In the following detailed description, use will be made of two range loops respectively paired with two azimuth loops, but a specialist in the field will understand that the present invention could also be implemented with a single range loop paired with a single azimuth loop, at the price of a slightly more complex processing of certain data.

After the execution of these loops 19, the function 34 consists in a filling of the trace memory $SM_{ij}$ ($D_i$, $G_j$). This trace memory is the memory 88 of FIG. 2A.

This completes the operations carried out at the rate of 2 Hz.

Now, starting from the content of the memory SM, the operations will be carried out at the rate of 50 Hz, as illustrated by functions 35 and 37. The change of rate raises synchronization problems between memories. One way of resolving these problems consists in providing buffer memories 91-1 and 91-2 functioning alternately, which enables the interrogation of a part of the memory 88 which is not being processed by the operator 86.

More precisely, the functions 35 consist in a "zoom" computation, which is in fact a variable magnification of the image taking account of the movement made by the aircraft since the previous refresh of the radar memory. The function 35 also consists, in particular, in a brightness computation, taking account of certain characteristics of the image.

Finally, the function 37 is the plot of the image, which is carried out using the means already described with reference to FIG. 2B, downstream of the inverter 96.

Figure 4:
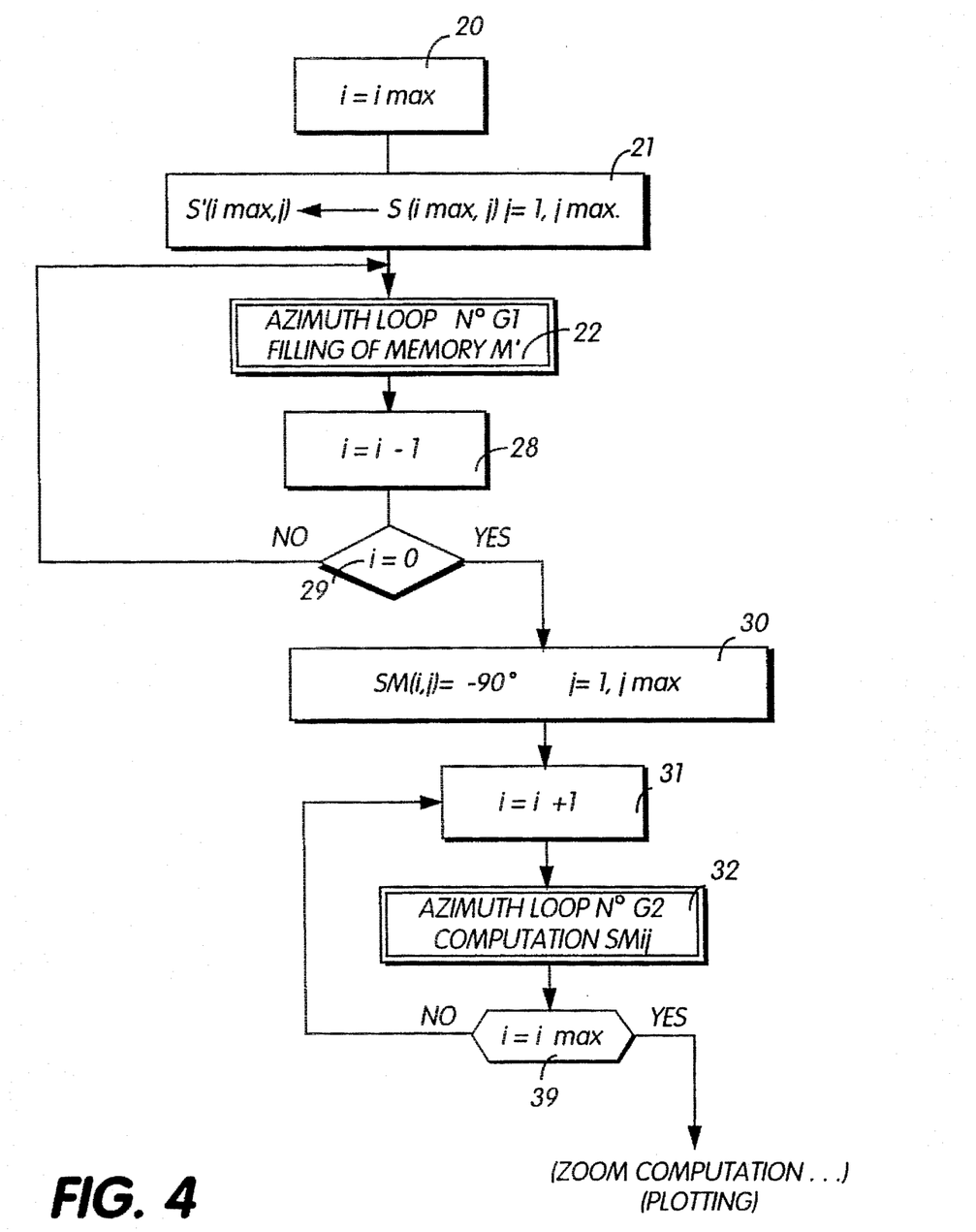
FIG. 4 is a more detailed diagram of the loops forming phase 19 of FIG. 3.

FIG. 4 shows the two range loops consecutively.

The first range loop starts from an initial step 20 where the index i of the ranges is set to its maximum value $i_{max}$. In other words, this loop will start from the largest range, and then progressively shorten the range, i.e. "approach the observer".

At the most distant range, the operation 20 allocates as an elevation value S'($i_{max,j}$), the value S($i_{max,j}$), and it does this for all values of azimuth, i.e. for j between 1 and $j_{max}$.

This first datum can be immediately transmitted into the memory M' 84, or to a subsequent step.

Then, the first azimuth loop will fill the other locations of the memory M', as indicated in function 22.

Each time that one line of the memory M' has been filled by data corresponding to new current range and to different values of azimuth, of modified blips, the current range index is decremented (step 28 in which i is decremented by one unit). A final test 29 determines if the smallest range has been reached, whose index is i=0. If such is the case, the sequence progresses to the second range loop.

This begins with a first step 30 which initializes the elevations of the image memory SM(i,j) to the minimum value of −90°, and it does this for all values of the azimuth index, i.e. for j between 1 and $j_{max}$. It is recalled that the range index i is at its zero value.

The next step 31 increments the range index by one step, and the functions 32 carry out the second azimuth loop, which enables the computation of all the values of $SM_{ij}$, in the way which will be explained with reference to FIG. 6. The memory SM or memory 88 is consequently filled each time.

Each operation of the azimuth loop 32 is followed at 39 by a test which determines if the maximum range has been reached whose index is $i_{max}$. If this is not the case, the range index i is incremented by returning to step 31. In the opposite case, the second range loop is completed, and its "YES" output indicates that it is possible to carry out the subsequent zoom and brightness computations, prior to the plotting of the image, and this is to be done for the new data values coming from the radar.

Figure 5:
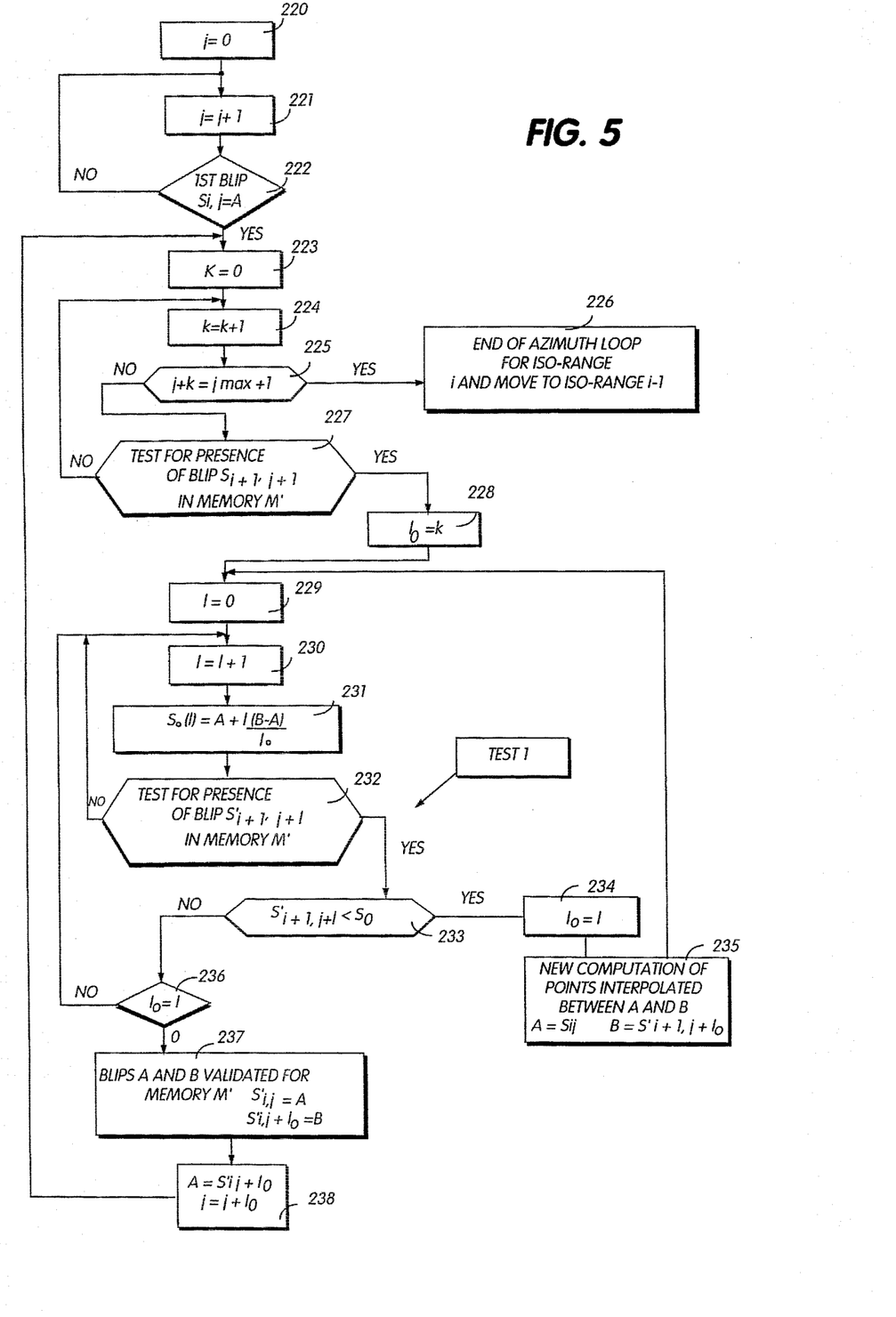
FIG. 5 is an even more detailed diagram of the loop 22 of FIG. 4.
Figure 6:
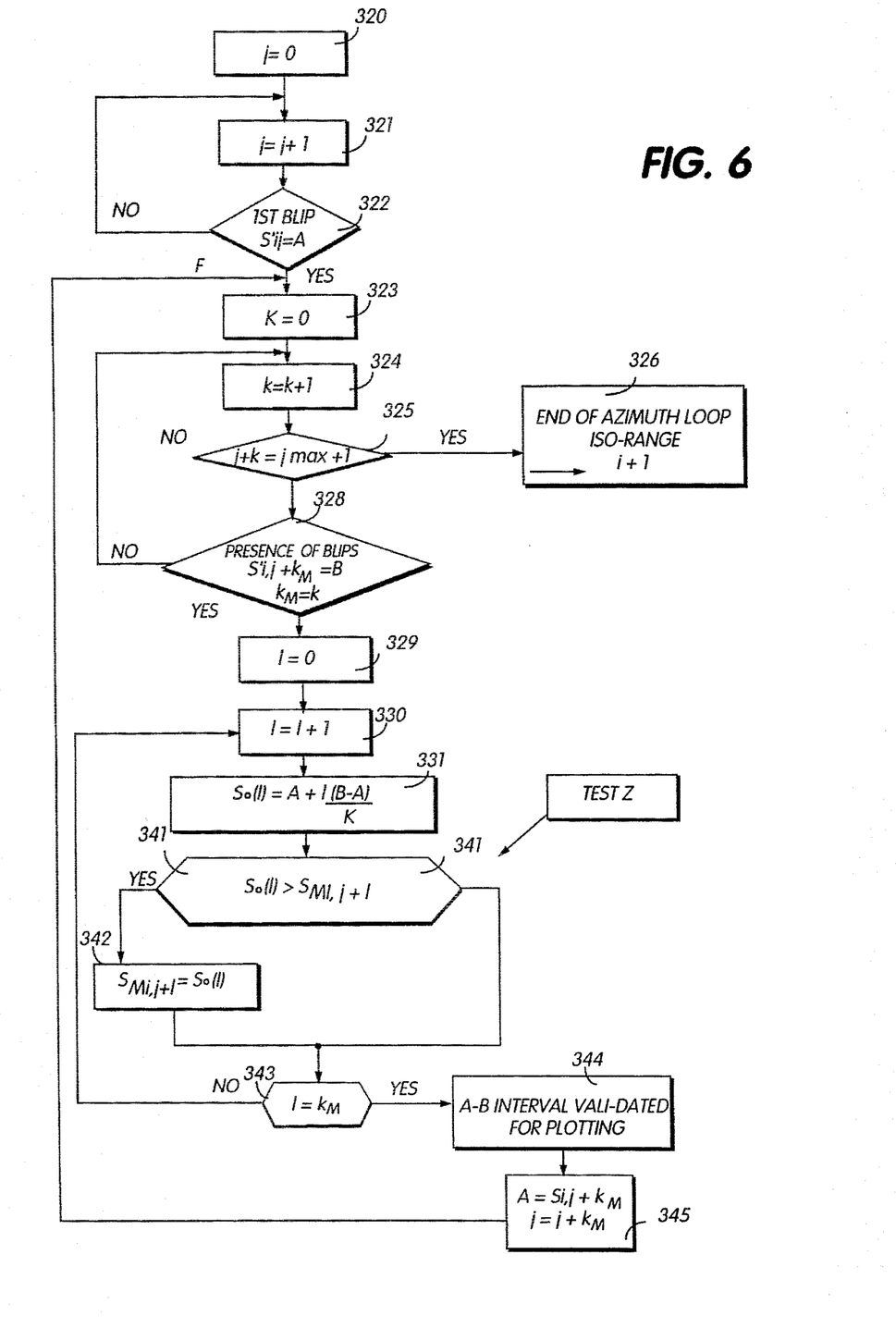
FIG. 6 is an even more detailed diagram of the loop 32 of FIG. 4.

Before proceeding with the description of the two azimuth loops of FIGS. 5 and 6, it is appropriate to recall that the extractor of a radar is associated with a threshold. The result of this is that the radar output, after this extractor, does not systematically supply a datum for each range and azimuth point. Such a datum is only available when the level of the signal exceeds the extractor threshold, which then constitutes a "radar blip".

One of the difficulties to be resolved for the implementation of the invention therefore consists, starting from a radar image which by its very nature is incomplete, in supplying an image suitable for display.

The azimuth loop of FIG. 5 starts from an initialization stage 220 setting the azimuth to its minimum value j=0.

The next stage 221 increments the azimuth index by one step.

The next step 222 is a test to determine if a radar blip is actually being encountered. The output of the test 222 returns to step 221 in order to increment j until such a radar blip is actually discovered, which is then designated by A.

Then, the step 223 initializes a new index k to the zero value, this index then being incremented by one unit in step 224.

A test 225 then determines if the azimuth index j+k exceeds its maximum value. If it does, the step 226 marks the end of the azimuth loop for the iso-range i which is being considered, and the sequence will return to the first range loop of FIG. 4, in order to decrement i in step 28, and then progress to iso-range i−1.

In normal times, it will be the "NO" output of step 225 which will be taken, in order to progress to a test 227 which determines the presence of the closest blip to A at the iso-range i, this blip, $S_{i,j+k}$ being referenced B. As before, this is carried out by the incrementation of k until such a blip is obtained.

In step 228 the value of k which has actually given the second blip B is given the reference $l_0$.

A step 229 will now initialize an index l at zero, this index l then being incremented by unity in step 230.

A step 231 then determines the value $S_0$ (l) which, for each value of l, will define a linear interpolation between the blips A and B, by the formula shown in FIG. 5. As $l_0$ is the azimuth deviation between the points A and B, an interpolated elevation is determined between A and B for each value of the index l which varies from 0 to $l_0$ when passing from A to B.

At the same time, and at each value of l, interest will be taken in what has been produced up to the present time, at greater ranges, for the same azimuth, from data contained in the memory M' (test No 1).

Thus, the test 232 determines if a blip $S'_{i+1,j+l}$ exists in the memory M'.

If this is not the case, the sequence simply progresses to the next value of l by incrementation in step 230.

If this is the case, a test 233 determines if this previously stored value $S'_{i+1,j+l}$ less than the value $S_0$ (l) which has just been determined in step 231. If the most distant elevations, previously accumulated, are greater than the current value $S_0$ (l), the sequence passes to a test 236 which, insofar as l is still less than $l_0$, increments it in step 230.

If on the other hand l=$l_0$, the test 236, by means of its YES output, leads to a step 237 which validates the blips A and B in the memory M', by putting $S'_{i,j}$=A, while $S'_{i,j+l_0}$=B. The step 238 determines that the former blip B will become a new blip A, with A=$S'_{i,j+l_0}$, while the value of the azimuth index j jumps to j+$l_0$. It is then possible to return to step 223 in order to search for a new neighbouring blip B, at larger azimuths.

Events occur differently when the cumulated elevations, previously determined at the greatest ranges, are less than the elevations $S_0$ determined by step 231. In effect, an anomaly then appears, as a more distant point of lower elevation should not have been visible to the radar.

The YES output of test 233 then goes to a step 234 which puts $l_0$=l; $l_0$ becomes the increment deviation between the point A and the new point B.

A step 235 will now perform a new computation of points interpolated between the blips A and B, for which the blip A remains the same as before, while the blip B modified:

A=$S_{i,j_0}$

B=$S'_{i+1,j+l}$

It is then possible to return to step 229, the interpolation now being carried out between the same point A as before, and the newly determined point B, the first time that the interpolation between the previous A and B has led to the said anomaly.

Figure 8A:
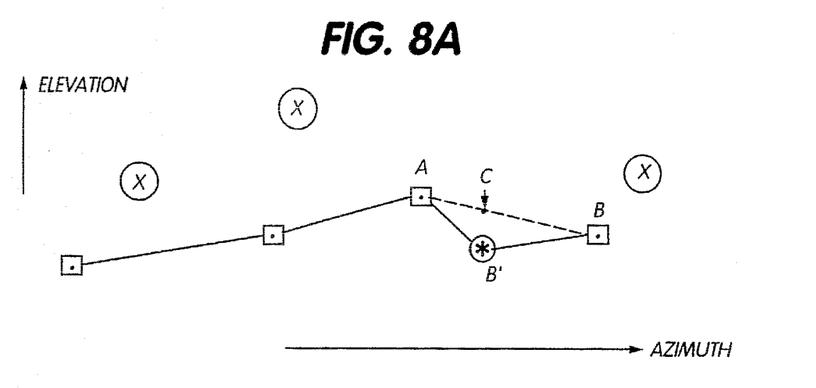
FIGS. 8A and 8B are diagrammatic illustrations enabling a better understanding of certain functions appearing in FIGS. 5 and 6.

The exact functioning will be better understood with reference to FIG. 8A.

The elevations are represented vertically, and the azimuths are represented horizontally. The points marked by a cross are relative to the iso-range i+1, and therefore correspond to information contained in the memory M'. The points marked with a dot • surrounded by a square relate to the current iso-range i.

The normal interpolation between the blips A and B is carried out as shown as a dotted line in FIG. 8A.

If a blip B' appears at C resulting from data recorded in the memory M', the interpolation is then modified.

When point B' is arrived at, the blips A' and B' are written in the memory in line i, and a new interpolation between the point B' (new point A) and the previous point B will be made.

This is the way in which the mechanism described with reference to FIG. 5 operates.

A specialist in this field will have understood that the mechanism is cumulative. Because the scanning of the iso-ranges is carried out starting from the most distant ranges, the previous iso-range integrates each time the comparison with all the lower elevations which may have been encountered at all greater iso-ranges. That is why it is sufficient to have a single test in line i+1 of the memory M', as shown in step 232 of FIG. 5.

Also, the interpolation which is carried out during this first azimuth loop is not entered into the memory M'. It is therefore transitory. Only the finally chosen blips are stored. It is, of course, possible to envisage also making an extrapolation from the extreme blips of each iso-range.

After having thus determined the content of the memory M± for all the iso-ranges, the sequence passes from the first range loop of FIG. 4 to the second, through the YES output of test 29.

It is recalled that the elevations are then initialized at −90° for the first range, the closest, the zero index.

This second range loop brings the second azimuth loop illustrated in FIG. 6 into operation.

The steps 320 to 328 in FIG. 6 are rather similar to steps 220 to 228 in FIG. 5. At the start, there is produced as before an indexing of the azimuth index by unity. Step 322 will determine a first blip S' from the memory M'. Then, starting from this blip there is defined an index K which will be incremented in relation to the current value of j. The steps 325 and 326 are similar to the steps 225 and 226 except that, after the end of the azimuth loop, the sequence now passes to the next iso-range i+1 instead of the previous iso-range i−1.

In step 328 the first blip is discovered which follows the already determined blip A, from data contained in the memory M' or 84. This blip $S'_{i,j+k}$ is referenced B, and the value of k obtained for this blip B is now called $k_M$.

Then, the steps 329 and 330 produce an incrementation on a new index l which will serve, as before, as an interpolation factor between blips A and B, the interpolation factor being given in step 331.

The test 341, having the same principle as the test 233, operates however in a different way (test No 2): it is now a matter of determining if the current elevation $S_0$ (l) is greater than the elevation of the image memory SM, determined up to the present, for the azimuth j+l. If the condition is verified (YES output of test 341), it is the point $S_0$ (l) which is visible, and a new point $SM_{i,j+l}$ of elevation $S_0$ (l) is entered into the image memory.

This operation is carried out for all the values of the index l between A and B, by a NO return from test 343 to the incrementation 330, until $l=k_M$ is obtained.

When this condition is verified, the YES output of the test 343 validates the interval A−B for the plotting, i.e. validates the data which have just been prepared by interpolation between A and B.

After this a step 345 defines the former point B as a new point A, of elevation $S_{i,j+k_M}$, while the value of j jumps to the previous value $j+k_M$.

If on the other hand the output of the test 341 had determined that the current elevation $S_0$ (l) is lower than the previous value stored at the same azimuth, then the point is not visible and no information is entered into the memory SM.

Then, the sequence returns as before to the loop test 343.

Figure 8B:
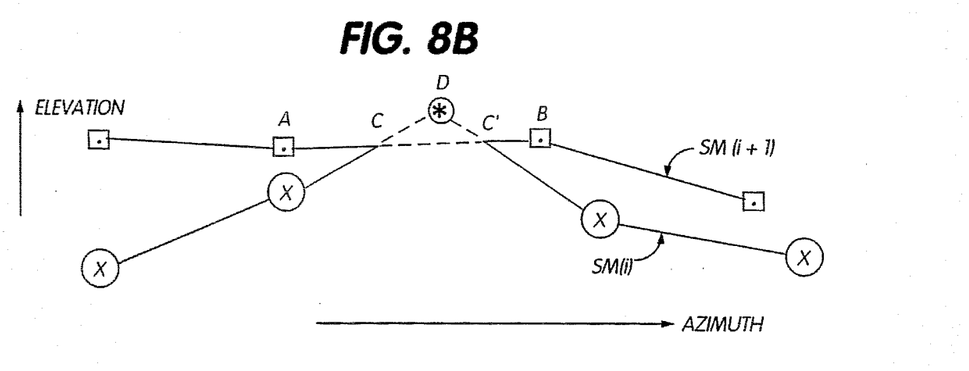

In order to gain a better understanding of the exact operation of the mechanism of FIG. 6, reference is made to FIG. 8B in which information has been illustrated in the same way as in FIG. 8A. However, the blips marked by a cross are now those of the iso-range line i−1, such as supplied by the memory SM, while the points actually marked by a dot surrounded by a square relate to the current iso-range, which is in the process of being interpolated and tested for entering into the memory SM.

FIG. 8B illustrates what happens during the interpolation between the points A and B. While no previously determined point at the closest iso-ranges projects over the segment AB, the interpolation is carried out normally. On the other hand, the previously determined peaks will be dominant in the interpolation between A and B as shown by the segment CC' in FIG. 8B.

Therefore, the memory SM will be filled, starting from the shortest iso-ranges up to the longest. The complete filling is determined by the test 39.

It now remains to observe that between two complete fillings of the memory $SM_{ij}$, the radar data will become "older" as the new filling or refresh of the memory SM is approached.

In order to compensate for this effect, it is advantageous to determine a magnification of the image as a function of the movement of the aircraft.

Figure 7:
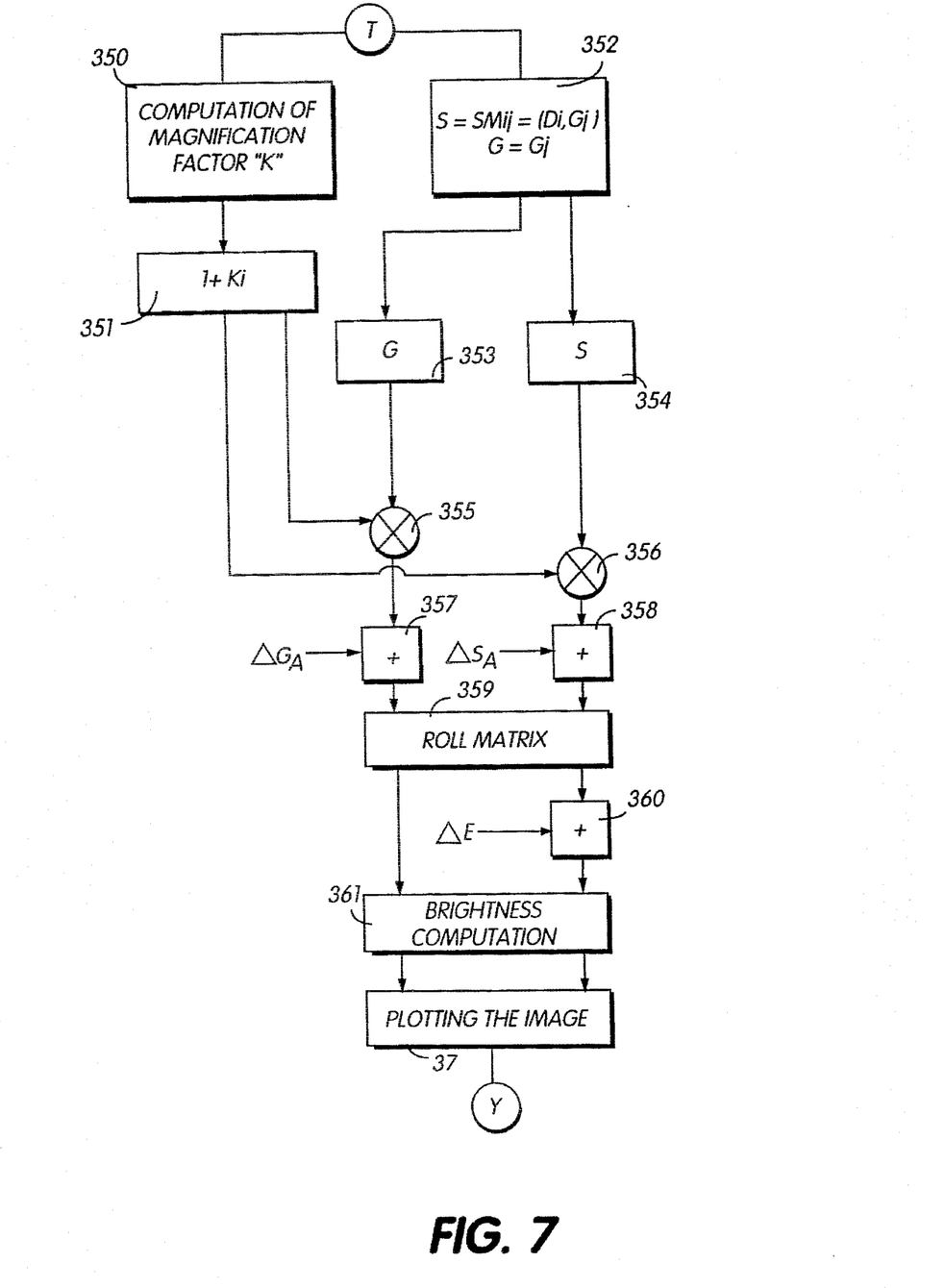
FIG. 7 is a detailed diagram of stages 35 and 37 of FIG. 3.

This is what is done by FIG. 7, with the help of a first step 350 of the functions 35 of FIG. 3.

This first step 350 therefore consists in computing a magnification factor K, which can be expressed to a first approximation as the ratio of the progress of the aircraft ΔA to the distance $D_i$ of the considered point.

The step 351 transforms this magnification factor into a multiplication factor, which is therefore $1+K_i$, the index i, of course, being associated with the range.

These operations are naturally carried out for all the points which will be considered in the image memory SM.

Apart from this, step 352 defines a change of notation, as the elevation $SM_{ij}$ of the point whose coordinates are the range $D_i$ and the azimuth $G_j$ will now be called S, while this azimuth $G_j$ will be called G.

There therefore appears at the output of block 352 an azimuth channel G and an elevation channel S, as shown in blocks 353 and 354.

The blocks 355 and 356 respectively apply the magnification factor $1+K_i$ to the azimuth and elevation data coming from blocks 353 and 354.

In their turn, the outputs of the multipliers 355 and 356 are applied to adders 357 and 358 which produce an azimuth correction and an elevation correction respectively referenced $G_A$ and $S_A$. These two corrections enable entry into the aircraft reference axes, taking account of the movement which the aircraft may have made since the previous refresh of the radar data. It is clear that this variation in azimuth and elevation can be taken into account by addition.

Also, the roll attitude of the aircraft may have changed. The correction to be carried out is therefore of a matrix type as indicated in step 359.

There finally remains, in the elevation channel after the roll correction, an elevation deviation ΔE which is applied by an adder 360, in order to take account of the fact that the reference of the sight in which the image will be produced can be offset with respect to the axis of the aircraft.

All that now remains is to carry out a brightness computation in step 361 and then to carry out the plotting of the image as mentioned in block 37. This image plotting can be carried out either in vector mode or in frame scanning mode as already described with reference to FIG. 2B.

This brightness computation can be carried out in the way described in the above-mentioned application No. 8316580 by Applicant's assignees for a Certificate of Addition, the disclosure of which is incorporated into the present description by reference in order to contribute to the definition of the brightness computation. In particular, it is recalled that the brightness computation advantageously makes the following occur:

a reduction in the brightness as a function of range, elimination of areas made too bright by an excess of samples.

In said application for a Certificate of Addition, the zones which are too bright were basically produced at long range, in the vicinity of the horizon line, in the case of reliefs which were defining lines that were too close.

According to the present invention, they are produced in a different way, because of the specifications of the radar.

It is known in fact that modern radars obtain their discrimination or resolution capability not only from range information, but also from Doppler information. The Doppler resolution power now happens to be finer at the edges of the beam than in the axis. The variation in resolution, in the data obtained from a radar, therefore happens to be not at all the same as that which could have been obtained, in the prior art, from a mass memory filled in xy with a fixed range step in both dimensions.

Figure 9:
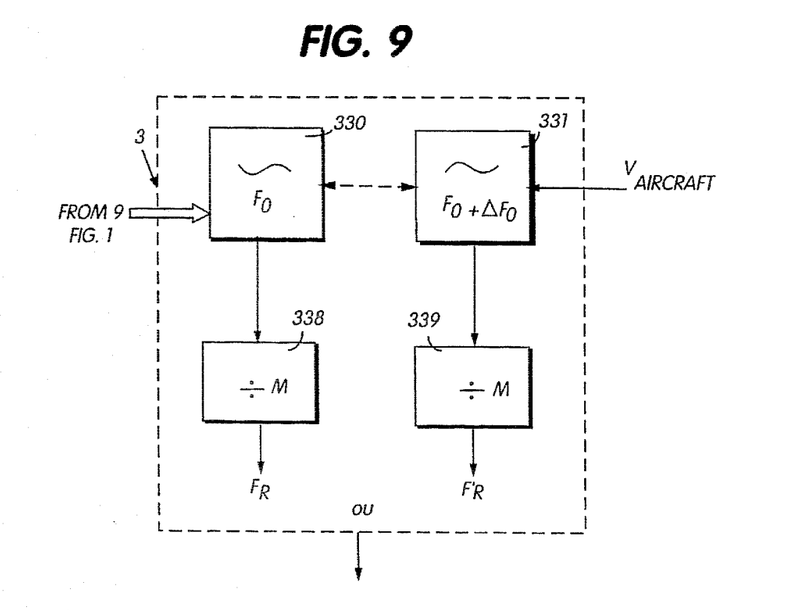
FIG. 9 is a more detailed diagram of the device 3 of FIG. 1.

The present invention also includes another important aspect, which is the variation in the functioning of the repetition frame generator 3 as a function of the movement of the aircraft.

This aspect is illustrated in FIG. 9: a frequency synthesizer is available which is capable of supplying by means of a stage 330, a fixed frequency $F_0$, and by means of a stage 331, a frequency $F_0 + \Delta F_0$, whose component $\Delta F_0$ is tied to the forward progress of the aircraft since the last refresh of the radar.

The two signals thus obtained are divided by M by digital dividers 338 and 339 whose outputs are then FR and F'R. At each refresh of the radar, the repetition frequency $F_R$ is returned to.

Between refreshes, the forward progress of the aircraft is detected, and there is a consequent action on the synthesizer 331, in order to change the value $F'_R$ of the repetition frequency in order to take account of the aircraft movement as explained hereafter.

The aircraft speed is called V.

During a repetition period $T_r = 1/FR$, the aircraft progresses by $\Delta D = V \cdot T_R = V/F_R$.

The repetition frequency $F'_R$ is made such that:

$$\frac{c}{2 \cdot F_R} - \Delta D = \frac{c}{2 \cdot F_{R'}}$$

Putting $\Delta F_R = F'_R - F_R$, and taking account of the fact that $F'_R$ is approximately equal to $F_R$, we obtain:

$$\frac{c}{2 \cdot F_R} - \frac{c}{2 \cdot F_{R'}} = \frac{V}{F_R}$$

from which:

$$\frac{c}{2} \cdot \frac{\Delta F_R}{F_R^2} = \frac{V}{F_R}$$

giving:

$$\frac{\Delta F_R}{F_R} = \frac{V}{2C}$$

It is in this way that starting from a sampling frequency $F_0$, it is possible to define the repetition frequency $F_R = F_0/M$, and then introduce into this repetition frequency a variation of the type $\Delta F_0/F_0 = V/2C$, as described previously.

In practice, the frequency $F_0$ is produced from a clock frequency $F_E$. The procedure used is a summation of phase increments $\Delta \phi$ of periods $T_e = 1/F_e$, giving:

$$\phi = 2\pi F_0 T$$

and:

$$\Delta \phi = 2\pi F_0 T_e$$

from which:

$$F_0 = F_E/2\pi \cdot \Delta \phi$$

In an example, it can be accepted that $F_0$ is equal to a quarter of $F_e$, giving as a result the value $\Delta \phi_0 = \pi/2$.

In order to generate the frequency $F_0 + \Delta F_0$, a phase increment $\Delta \phi$ is then necessary such that $\Delta \phi = \Delta \phi_0 + \Delta \phi_1$, with:

$$F_0 + \Delta F_0 = \frac{F_e}{2\pi}(\Delta \Phi_0 + \Delta \Phi_1) = \frac{F_e}{2\pi}\left(\frac{\pi}{2} + \Delta \Phi_1\right)$$

From this it results that $\Delta F_0 = F_e/2\pi \cdot \Delta \phi_1$, but also $\Delta F_0 = F_0 \cdot V/2c$. Finally there is determined $$\Delta \Phi_1 = \frac{F_0}{F_e} \cdot \frac{V}{C} \pi = \frac{V}{4C} \pi,$$

since:

$$\frac{F_0}{F_e} = \frac{1}{4}$$

More generally, the frequency $F_0 + \Delta F_0$ is produced by integration of phase increments $\Delta \phi$ of the form:

$$\Delta \Phi_0 + \frac{V}{2C} \Delta \Phi_0$$

or:

$$\Delta \Phi_0 \left(1 + \frac{V}{2C}\right)$$

A completely natural progression of the image created from the radar is then obtained in the sight and made available to the pilot of the aircraft.

In particular, it has proved possible for this sight to be a clear sight, i.e. a sight in which the synthetic image is superimposed on a real image.

By way of example, the refresh rate of the extractor memory M being 2 Hz, this memory is organized into 100 azimuth steps and 160 range steps.

For each of the range loops, there will therefore be carried out 100×160 tests, giving a total of 32,000 tests for the two range loops. Such a test is broken down into three elementary operations:
reading from memory,
comparison,
return to memory.

This therefore results in 96,000 elementary operations, giving a minimum rate of 192 kHz, from which the test frequency of 250 kHz mentioned above is derived for safety reasons.

It is recalled that, in overall terms, the extractor memory M or 80 is filled with radar blips, corrected for the effect of the movement of the aircraft during the extraction period. An azimuth-elevation sector of about 50°×25° is taken into account.

The memory M' is filled in the same way with the minimum elevation blips over the ranges i, i+1, etc., $i_{max}$, proceeding towards the shortest ranges.

The buffer memory MT functions alternately, one writing, the other reading.

Finally, the plotting can be carried out either television mode from two other buffer memories, or in vector mode, i.e. point-to-point mode as already described.

I claim:

1. In a device for recreating a dynamic image, the improvement comprising:

(a) an air-to-ground observation radar, having an output memory and means for choosing a repetition frame, and effective to supply a series of data or basic radar blips which are expressed in elevation, range and azimuth, said blips being stored in said output memory of the radar after having been acquired on the basis of a repetition frame chosen by said choosing means;

(b) means addressing said output memory in range and in azimuth in order to deliver the corresponding elevation information;

(c) range and azimuth processing means operative to carry out at least one range loop paired with at least one azimuth loop, while scanning said output memory of the air-to-ground observation radar in order (i) to replace the current blip by a possibly more distant blip of the same azimuth having a lower elevation; and (ii) to define at each range a substantially continuous sequence of image points obtained by at least one of interpolation and extrapolation between said blips, while taking into account at each azimuth closer image points having a higher elevation;

(d) a basic image memory for storing the image points thus obtained by said range and azimuth processing means;

(e) pre-display processing means and, at least one buffer memory associated therewith, both operative to determine the brightness of these points as a function of their range; and (f) means for displaying on board said vehicle an image composed of said points whose brightness has thus been determined.

2. A device according to claim 1, including means for time-shifting said repetition frame of the observation radar as a function of the movement of the vehicle.

3. A device according to claim 1, wherein the pre-display processing means are also effective to carry out (i) an image enlargement as a function both of the forward progress of the vehicle and of the range of each point between the refreshes of said output memory of the radar, and (ii) a modification of the geometry of the image as a function of the change in orientation of the vehicle since the last refresh.

4. A device according to claim 3, wherein said pre-display processing means also carry out a modification of the geometry of the image as a function of the position of the display means in the vehicle.

5. A device according to claim 1, wherein the range and azimuth processing means include means for executing a range loop according to increasing ranges.

6. A device according to claim 5, wherein the range and azimuth processing means include:

(i) an intermediate memory; and (ii) a first stage defining a first range loop paired with a first azimuth loop, said first stage being effective to scan the output memory of the radar in the direction of decreasing ranges in order to take into account, at each iso-range, any blips of lower elevation encountered at the same azimuth, over ranges greater than the current iso-range, to supply a series of modified blips, stored in said intermediate memory; and wherein said range and azimuth processing means further include (iii) a basic image memory; and (iv) a second stage defining a second range loop paired with a second azimuth loop and operative to scan the intermediate memory in the direction of increasing ranges, in order to define at each range a substantially continuous sequence of image points obtained by at least one of interpolation and extrapolation between said modified blips, while taking into account for the current range and at each azimuth closer image points having a greater elevation; and (v) means for storing the thus obtained image points in said basic image memory.

7. A device according to claim 6, wherein said first stage is effective to carry out at least one of an interpolation and an extrapolation, which is transitory, during the comparison carried out azimuth by azimuth between the current range and the greater ranges.

8. A device according to claim 6, wherein said first stage includes means for storing azimuth by azimuth, the lowest elevation encountered at ranges greater than the current range.

9. A device according to claim 6, wherein said second stage includes means for storing, azimuth by azimuth, the highest elevation encountered at ranges below the current range, and means for choosing the elevations of the current range at least equal to these highest elevations, azimuth by azimuth.

10. A device according to claim 1, wherein said range and azimuth processing means are operative according to a period at least ten times greater than that of the pre-display processing means.

11. A device according to claim 1, wherein said display means operate in a frame scanning mode with scan lines which are parallel to the visual horizontal.

12. A device according to claim 1, wherein said display means are operative in a point-to-point vector mode.

* * * * *